Jan. 26, 1971          K. W. HEMPHILL          3,558,223

DOCUMENT CENTERING APPARATUS

Filed Oct. 25, 1968          6 Sheets-Sheet 5

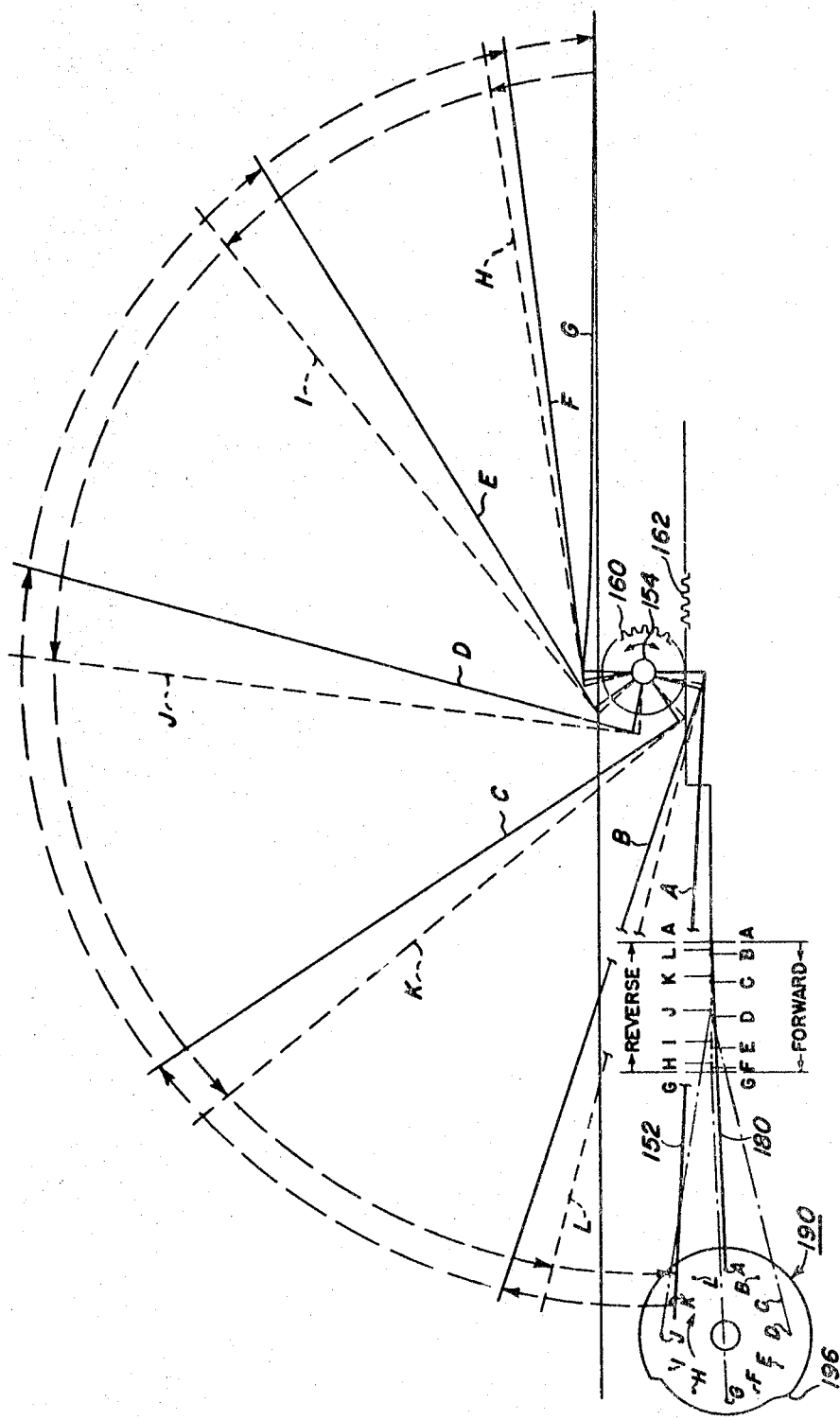

United States Patent Office 3,558,223
Patented Jan. 26, 1971

3,558,223
DOCUMENT CENTERING APPARATUS
Kent W. Hemphill, Rochester, N.Y., assignor to Xerox Corporation, Rochester, N.Y., a corporation of New York
Filed Oct. 25, 1968, Ser. No. 770,478
Int. Cl. G03b 27/62
U.S. Cl. 355—23                                        9 Claims

ABSTRACT OF THE DISCLOSURE

Apparatus for centering a document being transported from a first to a second station. The document is conveyed to and centered by two guide rods affixed to guide blocks. A driving means is operatively coupled to one of the guide blocks which, in turn, is coupled to the other guide block. As the document contacts the two guide rods, the driving means is energized and the guide rods are withdrawn as the document is photograhed to prevent the guide rods from casting a shodaw on the document. The guide rods are then returned to their initial position. Means are also provided for adjusting the guide rods to accommodate for various size documents.

BACKGROUND OF THE INVENTION

The widely accepted use of microfilm as a means for storing information has not only increased the use of microfilm but has also increased the need for expediting the handling of information to be recorded onto the microfilm. Presently, where it is desired to record, for example, a text in numerical sequence, tedious and time consuming adjustments must be made to position each document from the text at an exposure station for recording on a first side and then to invert and reposition the document for recording on a second side until the entire text has been recorded. When it is considered how many exposures must be made in producing a single recording of a text having several hundred pages, the need for a document handler that is able to rapidly transport documents to an exposure station, whereat the document can be accurately and quickly aligned with the recording means, as well as invert the documents for recording on a second side, becomes increasingly apparent.

SUMMARY OF THE INVENTION

Now in accordance with the present invention text documents may be recorded in proper sequence with a minimum of delay. Generally speaking, a continuously moving conveyor transports each document to a first gate which acts to arrest the document at the exposure position for recording on a first side. At the exposure station, the novel centering device which is the subject of the present invention contacts the document and accurately and quickly aligns it with the recording means, and after alignment, withdraws therefrom to prevent shadows during exposure. The centering device is adjustable to allow for various size documents. Still another gate in the flow path serves to arrest the document in a second position from where it is inverted on return to the exposure position by a document turner for centering and recording on a second side. Thus both sides of the document are recorded in rapid sequence.

It is an object of this invention to provide a novel centering device.

It is a further object of this invention to provide novel apparatus for accurately and rapidly centering documents at an exposure station in a recording unit.

It is also an object of this invention to provide apparatus for inverting and repositioning documents transported past an exposure station on a continuously moving conveyor for exposure on a second side and to provide novel, adjustable means for accurately and ripidly centering the documents at the exposure station.

DESCRIPTION OF THE DRAWINGS

For a better understanding of the invention as well as other objects and further features thereof, reference is made to the following detailed description which is to be read in conjunction with the accompanying drawings wherein:

FIG. 7 illustrates the various positions of the document inverter during operation.

DESCRIPTION OF THE PREFERRED EMBODIMENT

Figure 1:
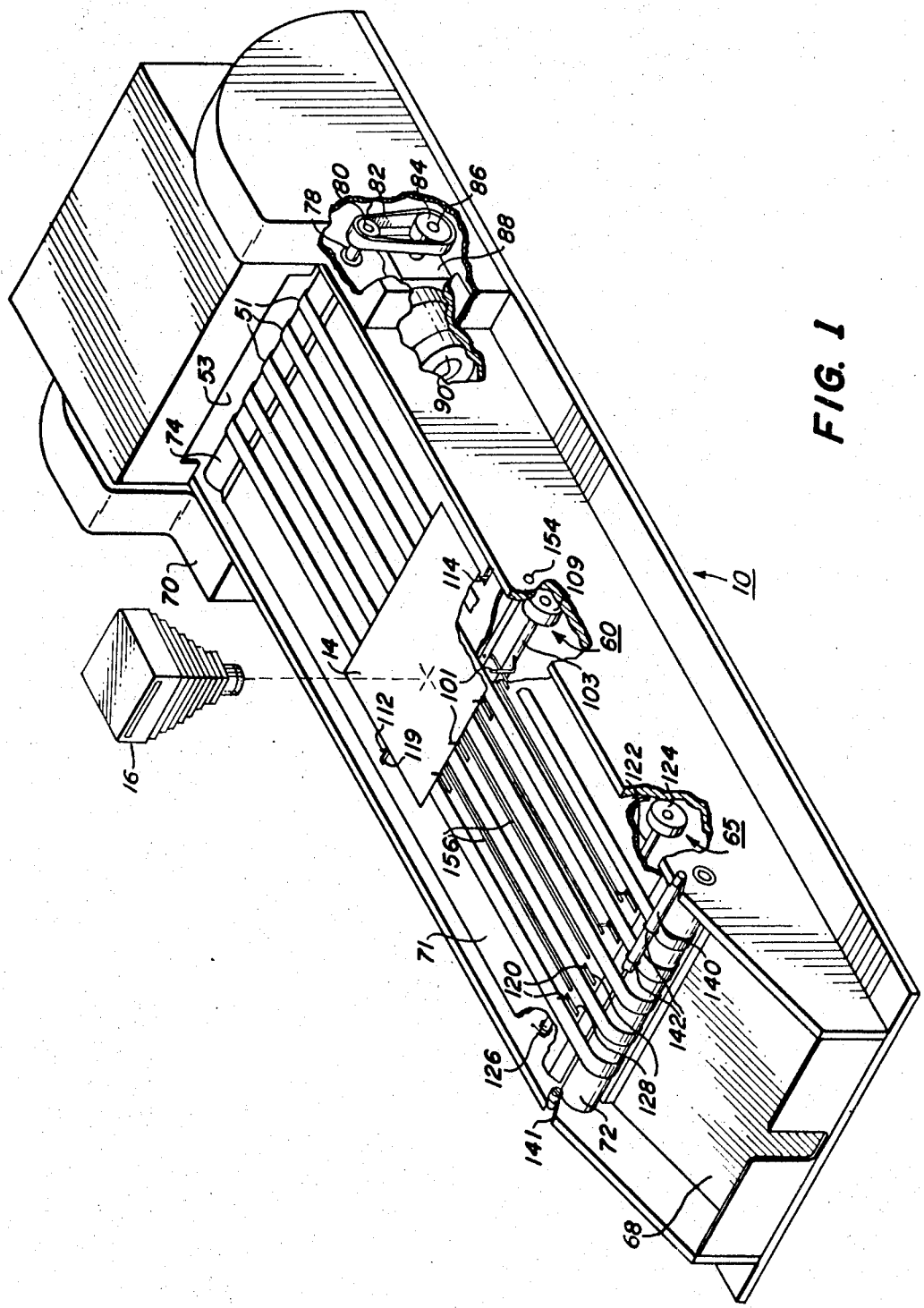
FIG. 1 is a perspective view of the document handler assembly supporting a document in the exposure position.

Referring now to FIG. 1 there is shown a document handler assembly generally designated 10 supporting a document or other graphic material 14 in the exposure position for recording by a microfilm camera 16 or the like. To accomplish this a plurality of endless belts 51 receive document 14 through feed slot 53 and advance it to a recording position abutting a depressable gate 60. After recording a first side, the document is advanced to a second position abutting depressable gate 65 from where it is repositioned and inverted for recording on a second side. When document 14 has had both sides recorded it is deposited in an output tray 68 and the next document is introduced onto continuously moving belts 51 through slot 53 by a document feeder, not shown. Any suitable document feeder mechanism may be used for this purpose, such as, a commercially available top feeding vacuum lift-off type, as this does not form a part of the present invention.

As shown in the figure, document handler assembly 10 comprises a housing 70 having a platen 71 for providing intermediate support to the horizontally spaced endless belts 51 which are mounted on a pair of spaced apart parallel rollers 72 and 74. Movement is imparted to the belts by roller 74 which is driven by a coaxially mounted drive shaft 78 having a pulley 80 mounted at one end thereof. Pulley 80 is driven by a belt 82 which is drivingly connected to a pulley 84 mounted on an output shaft 86 of a gear reducer 88 that has an input from a D.C. motor 90. In this manner, power from motor 90 provides a continuous smooth motion to endless belts 51.

Figure 2:
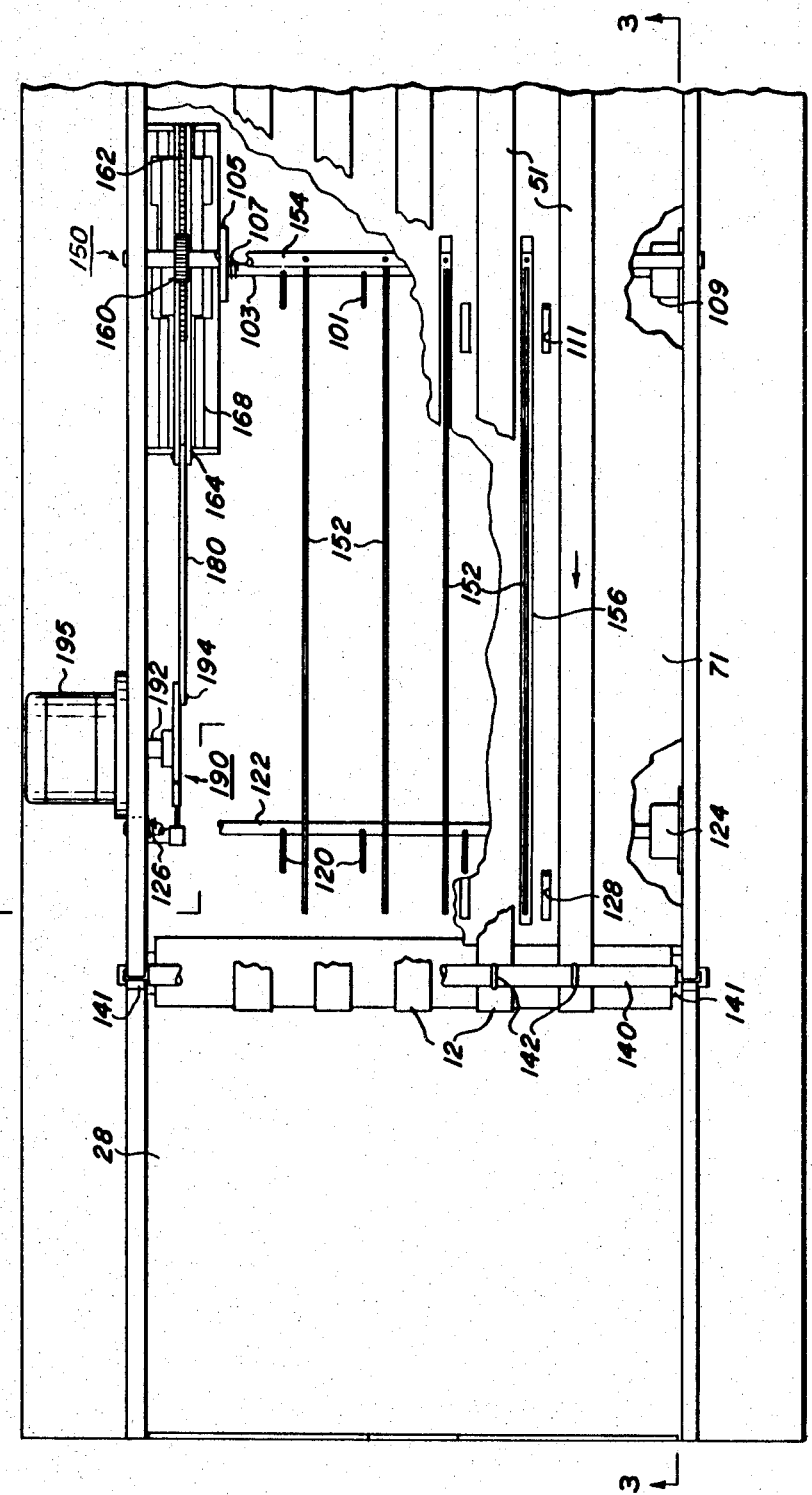
FIG. 2 is a plan view of the document handler assembly shown in FIG. 1.
Figure 3:
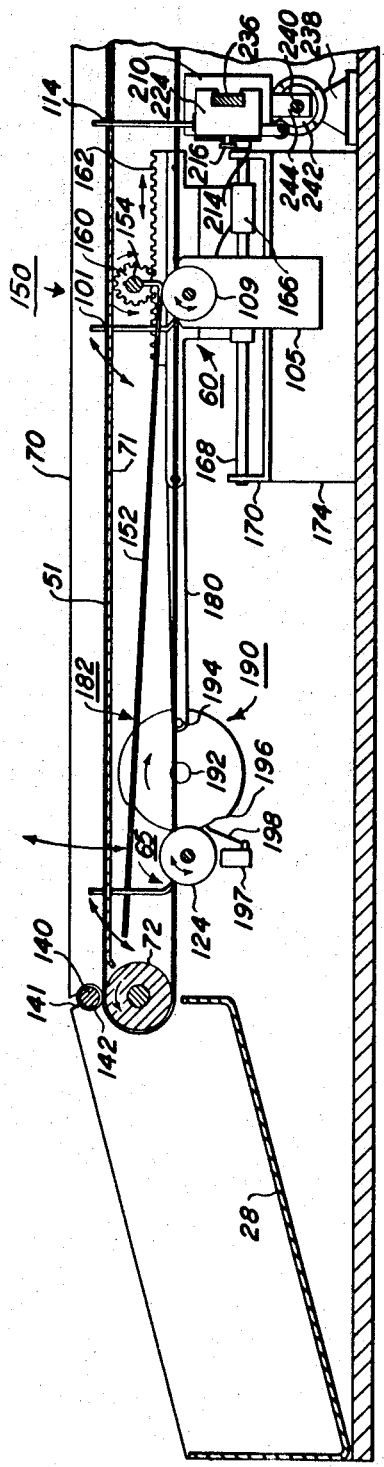
FIG. 3 is a side elevation view taken along line 3—3 of FIG. 2.
Figure 4:
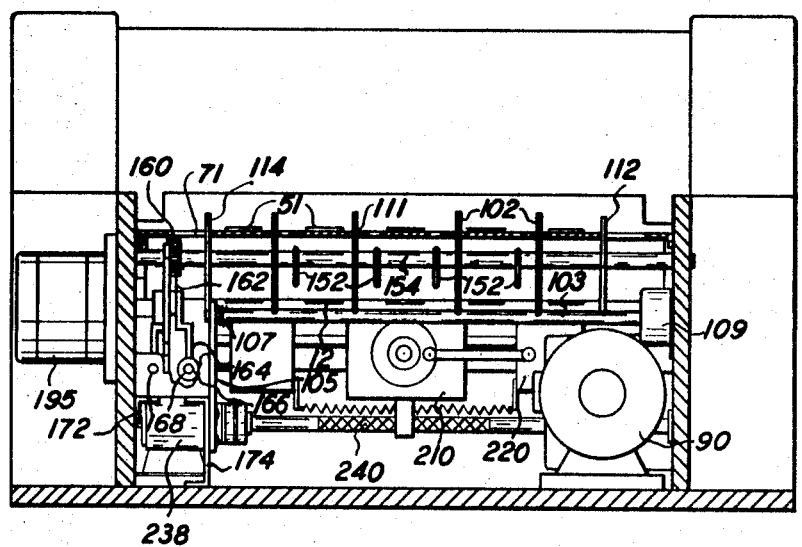
FIG. 4 is an end view taken along line 4—4 of FIG. 2.

To provide effective document registration at the recording position, gate 60 is provided with a plurality of spaced pins 101 connected to a shaft 103 that is mounted for rotation within housing 70 on a support plate 105 as best seen in FIG. 2, 3, and 4. Shaft 103 is urged by a spring 107 connected to housing 70 such that pins 101 normally extend in the vertical position above platen 71. A rotary solenoid 109, when energized, serves to rotate shaft 103 against the bias of spring 107 thereby depressing pins 101 below the surface of platen 71. Slots 111 are provided in platen 71 for receiving pins 101 therethrough. Upon deenergizing solenoid 109, pins 101 are restored to their normal position above platen 71 due to the biasing action of spring 107.

A pair of rods 112 and 114 are located adjacent gate 60 for centering the document 14 as it approaches the recording position. The actuation of the rods will be described hereinbelow with reference to FIGS. 3, 4 and 5. If desired, platen 71 may be constructed as a vacuum platen, with a suitable vacuum source and slots located adjacent gate 60 to provide additional restraint upon the document in the recording position.

Gate 65, which is similar in operation to gate 60, comprises a plurality of spaced pins 120 connected to a shaft 122 rotatably journaled within housing 70 and driven by a rotary solenoid 124 against the biasing of spring 126. Thus, when solenoid 124 is activated, the normal tension of spring 126 is overcome and pins 120 are depressed through slots 128 below platen 71 permitting the document to pass into output tray 68. A floating pinch roller 140 supported for rotation in slots 141 at the end of housing 70 acts to direct the document downwardly into tray 68. To facilitate this action, a plurality of rubber O-rings 142 are mounted on the pinch roller in alignment with each of the transport belts 51 so that firm contact may be had on the document during transport into the tray.

To record both sides of the document in rapid sequence, a document turner generally designated as 150 is also provided on document handler assembly 10. The document turner consists of elongated fingers 152 connected at one end of a shaft 154 that is mounted for rotation to move the fingers clockwise in an arc of approximately 180° and then counterclockwise thereby effecting the desired inversion of the document. Elongated slots 156 are located in platen 71 intermediate belts 51 to allow fingers 152 of the document turner to lift the document from the belts and flip it on its back before returning to an original starting position below the platen.

To accomplish this movement, shaft 154 has mounted at one end thereof a pinion gear 160 which meshes with a reciprocating fine pitch rack 162 to effect rotation of the pinion in first a clockwise and then a counterclockwise direction. Rack 162 is mounted for linear motion on a pair of spaced apart plates 164 which terminate in cylindrical linear bearing housings 166 that journal a pair of spaced apart parallel guide rods 168. Guide rods 168 are supported by a plate member 170 which is secured to housing 70 by angle brackets 172 and 174. A connecting rod 180 serves to couple spaced apart plates 164 with a driving crank assembly generally designated as 182. In this manner, a reciprocating motion is imparted to plates 164 so that a rotary motion may in turn be imparted to pinion 160 and hence to fingers 152 of the document turner 150.

To effect the desired smooth rotary movement to fingers 152 of the document turner 150, driving crank assembly 182 consists of a cam disc 190 which is mounted for rotation about a shaft 192. A crank pin 194 radially spaced from the center of cam disc 190 serves to drive connecting rod 180 in a cranking motion upon rotation of shaft 192 by a drive motor 195. To enhance the smoothness of operation, cam disc 190 has a profile 196 about the periphery thereof which serves to selectively control the power to motor 195 through a microswitch 197 by tripping a follower arm 198 thereby permitting the document turner fingers to coast into their rest position below platen 71.

Figure 5:
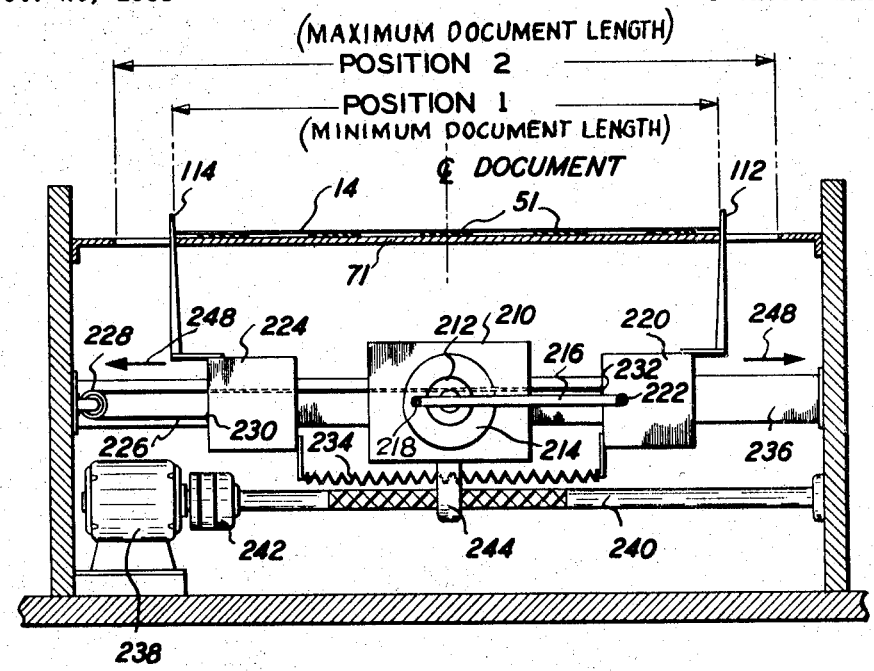
FIG. 5 illustrates the novel document centering apparatus of the present invention.

FIGS. 3, 4, and 5 illustrate the novel centering device of the present invention. The energization of a motor 210 rotates its associated shaft 212 and a disc 214 mounted on the shaft 212. The disc 214 is joined to one end of connecting rod 216 by crank pin 218, radially spaced from the center of cam disc 214. The other end of connecting rod 216 is coupled to a guide block 220 via connecting pin 222. Guide block 224 is connected to guide block 220 by a cable 226, the cable extending around a pulley 228. Guide blocks 220 and 224 have centering rods 112 and 114, respectively, affixed thereto. The cable 226 is affixed to guide block 224 at 230, extends around guide pulley 228 and is affixed to guide block 220 at 232. An extension spring 234 acts to maintain the guide block 224 at a position corresponding to the size of the document being centered. Motor 210 and guide blocks 222 and 224 are movably mounted on a guide bar 236. The shaft of a motor 238 is coupled to lead screw 240 via slip-clutch 242. A nut 244, affixed to motor 210, advances the motor 210 along guide bar 236 as the lead screw 240 is caused to rotate.

As the shaft of motor 210 rotates, guide block 220 and centering rod 112 travel along guide bar 236 in the direction indicated by arrow 248 from initial position 1 to position 2 and returns to initial position 1 after document 14 is photographed. The dimensions of connecting rod 216 determines the actual distance of travel between positions 1 and 2. Guide block 224 is controlled by the motion of guide block 220 by means of the cable 226, cable pulley 228, and spring 234. In this type of operative connection, rods 112 and 114 move outward from the document center line and return to the initial position as shaft 212 completes one revolution.

In operation, document 14 enters the machine via endless belts 51 and advances to the recording position determined by depressible gate 60 as shown in FIG. 1. Document 14 is initially centered by rods 112 and 114. When the document 14 strikes gate 60, motor 210 is energized and shaft 212 begins to rotate. To effect the desired traverse movement to rods 112 and 114, the driving crank assembly, which comprises cam disc 214 mounted for rotation about shaft 212 and connecting rod 216 affixed thereto by pin 218, is driven in a cranking motion upon rotation of shaft 212. As described with reference to the cranking motion of the document inverter illustrated in FIG. 7, the initial rotation of shaft 212 in the clockwise direction causes the connecting rod to be pulled to the right to avoid photographing any shadows that may be cast by rods 112 and 114 as document 14 is photographed. As the shaft 212 completes one revolution in the clockwise direction the connecting rod 16 moves from right to left thereby reversing the direction of movement of the guide blocks 220 and 224, returning the blocks to its initial position.

FIG. 5 shows the novel device of the present invention in position for handling documents of a predetermined minimum size. In order for the device to center documents of a greater size, the motor 210 is moved from its minimum document size position by the operation of motor 238 and lead screw 240. The screw rotation drives nut 244 in the direction of the screw advance, thereby driving motor 210 and guide block 220 to the desired position. The cycle of operation of the device recited hereinabove is then initiated to center the document of increased size. The device can then be adjusted to handle smaller document sizes by causing lead screw 240 to rotate in the opposite direction.

The positioning cycles are proportional to the speed of motor 210. For example, a 30 r.p.m. motor would permit a total cycle time of two seconds. Higher motor speeds will proportionally allow faster positioning cycles.

Figure 6:
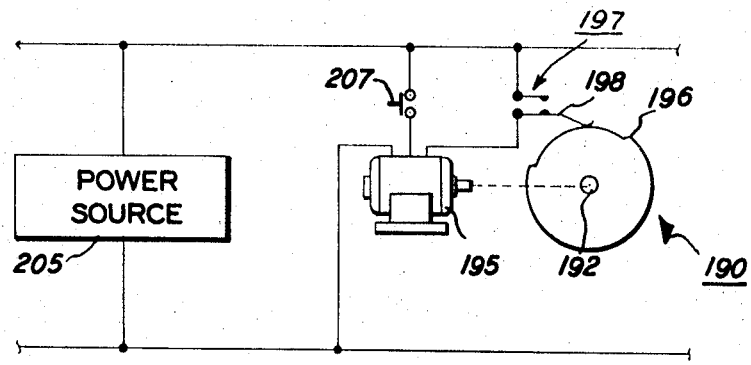
FIG. 6 is a schematic view illustrating the drive of the document inverter.

Referring now to the document inverter drive apparatus shown in FIG. 6, the drive motor 195 for rotating shaft 192 is energized from a power source 205 via microswitch 197. Alternatively, power may be supplied by manual actuation of a switch 207. Switch 207 is closed momentarily to start rotation of disk 190. This causes the disk to rotate sufficiently so that the raised portion of a profile 196 on the periphery of the disk urges follower arm 198 to close microswitch 197 thereby maintaining power to motor 195. When microswitch 197 opens, disk 190 comes to a stop gradually due to its own inertia. As can readily be appreciated, this same type of movement is imparted in turn to rack 162 and fingers 152 of the page turner so that for each cycle of document reversal, fingers 152 glide smoothly into their normal position below platen 71.

In FIG. 7, there is shown various positions A through L of the fingers 152, connecting rod 180, and disk 190 of the document turner mechanism. As shown, in the starting position A, the fingers of the document turner are slightly below the horizontal transport plane of the document handler and the connecting rod is all the way to the right when looking at the figure. Upon clockwise rotation of the disk to position B, the connecting rod is pulled to the left advancing the flipper fingers above the horizontal thereby lifting document 14 from transport belts 51. In position C, the connecting rod is still further to the left as the fingers approach the vertical position D. At this position the document is held against the rapidly turning fingers by aerodynamic forces, and will cling to the fingers which are now advancing at maximum velocity. Upon further rotation of the disk, the connecting rod moves through positions E and F to its furthermost position G on the left which corresponds to about a 180° rotation of the fingers. Thus as the document approaches the horizontal plane, deceleration forces act upon the turning fingers, allowing the document to settle onto the platen. In this manner a positive control over the document is maintained at all times. Upon further rotation of the disk, the connecting rod moves from left to right thereby reversing the direction of rotation of the fingers through positions H and I to position J where the fingers are at approximately the vertical position again. By this time, the cam profile 196 on the disk is such that a recess which covers approximately 90° is passing adjacent follower arm 198 thereby opening microswitch 197 and de-energizing the motor 195. This allows the document turner to be brought to a gliding rest through positions K and L to position A just slightly below the horizontal from which the action started.

Figure 8:
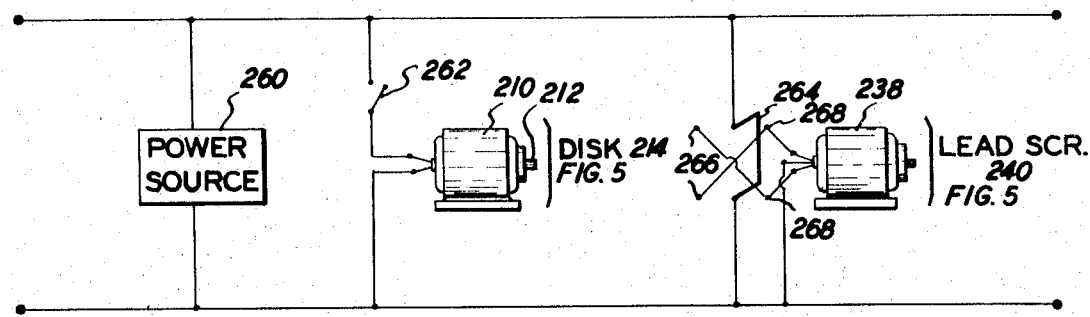
FIG. 8 is a schematic view illustrating the drive of the document centering apparatus.

Referring now to the document centering drive apparatus shown in FIG. 8, the drive motor 210 for rotating shaft 212 is energized from a power source 260 via switch 262, the switch being closed automatically when document 14 arrives at the recording position. Alternately, power may be supplied to motor 210 by manual actuation of the switch. Power source 260 also energizes drive motor 238, the shaft rotation of which drives lead screw 240. Motor 238 is energized by manual actuation of double-pole-double-throw switch 264. Motor 238 is of the reversible type, wherein activation of switch 264 to position 266 will apply a voltage of a positive polarity to the motor causing the motor shaft to rotate in one direction and activation of switch 264 to position 268, will cause the motor shaft to rotate in the opposite direction, therefore enabling forward and reverse drive of the lead screw 240.

The use of the centering device of the present invention is not limited to the recording apparatus disclosed herein. Further possible uses of the centering devices include, for example, assembly line inspection of items, such as printed circuit boards where any deviation of an optical image of the printed circuit board against a standard master causes automatic rejection.

By the apparatus described above there has been disclosed a document handler admirably suited for the mass production of texts onto microfilm or the like. Heretofore it has not been possible to record a text in numerical sequence without painstakingly inverting each document from the text for exposure on a second side. Now in accordance with the present invention documents are supplied to the recording station on a continuously moving conveyor and accurately centered and inverted for recording on both sides without altering the movement of the conveyor or otherwise interfering with the recording cycle. Hence high quality recordings can be produced with a minimum of delay. The centering device of the present invention provides faster cycling speeds, is adjustable for various document sizes and is more accurate than prior art centering devices.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teachings of the invention without departing from the essential teachings thereof.

What is claimed is:

1. A device for centering material being transported along a path from a first station to a second station comprising:
   first means for driving a connecting member affixed thereto,
   a first member operatively connected to said connecting member, said first member including a first guide means affixed thereto, and
   a second member coupled to said first member, said second member including a second guide means affixed thereto, said first and second guide means being located at an initial position to contact said material to center it, said first and second guide means withdrawing to a second position and subsequently returning to said initial position when said first driving means is energized.

2. The device as defined in claim 1 wherein the movement of said first member in a first direction transverse to the transport path causes said second member to move an equal amount in the opposite direction.

3. The device as defined in claim 1 further including means for adjusting said initial position.

4. The device as defined in claim 3 wherein said adjusting means comprises a lead screw coupled to a second driving means, said lead screw coupled to said first driving member, said second driving means positioning said first and second members until said first and second guide means are separated an amount corresponding to the size of the material being centered.

5. In a document recording unit in which documents are transported along a path to an exposure position relative to a recording medium and including document inverting apparatus for effecting placement of a second side of said document at said exposure station, an improved means for centering said document at said exposure station comprising:
   means for driving a connecting member affixed thereto,
   a first member operatively connected to said first connecting member, said first member including first guide means affixed thereto, and
   a second member coupled to said first member, said second member including a second guide means affixed thereto, said first and second guide means being located at an initial position to contact the edges of said document thereby centering it, said first and second guide means withdrawing to a second position and subsequently returning to said initial position when said driving means is energized.

6. The centering means as defined in claim 5 further including means for positioning said first and second members to an initial position dependent upon the size of said document.

7. The centering means as defined in claim 5 wherein the movement of said first member in a direction transverse to the transport path causes an equal movement of said second member in the opposite direction.

8. The centering means as defined in claim 6 wherein said positioning means comprises a second driving means and a lead screw coupled thereto, said lead screw operatively coupling said second driving means to said first member, said second driving means being operative to drive said first member until first and second guide means are separated a distance corresponding to the size of the document to be centered.

9. The centering means as defined in claim 8 wherein said centering means except for said first and second guide means is located below the document level.

References Cited

UNITED STATES PATENTS 2,465,631   3/1949   Bruestle _____ 242—71.9

JOHN M. HORAN, Primary Examiner

R. A. WINTERCORN, Assistant Examiner

U.S. Cl. X.R.

242—71.9; 352—33, 162, 224; 355—48, 64, 75